United States Patent

[11] 3,543,948

[72] Inventor Robert N. Tatum
Rte. 1, Burden, Kansas 67019
[21] Appl. No. 769,630
[22] Filed Oct. 22, 1968
[45] Patented Dec. 1, 1970

[54] PORTABLE AUGER APPARATUS
4 Claims, 8 Drawing Figs.
[52] U.S. Cl................................................ 214/17;
198/213, 198/233
[51] Int. Cl.......................................................B65g 41/00;
B65g 33/10
[50] Field of Search............................................ 214/17.8;
198/213, 233

[56] References Cited
UNITED STATES PATENTS
3,132,740  5/1964  Myer............................ 198/233

3,356,234  12/1967  Seekamp et al................ 214/17(.8)

Primary Examiner—Robert G. Sheridan
Attorney—John H. Widdowson

ABSTRACT: This invention is a portable auger apparatus operable to remove grains and the like from storage bins for subsequent conveyance by an auger conveyor to a transport truck or the like. More particularly, this invention is a portable auger apparatus including an auger means having an elongated auger assembly provided with an open frame assembly thereabout; a power means supported on the frame assembly and operably connected to the auger means to provide the operating power thereto; and a support assembly secured to the frame assembly adapted to engage a support surface to provide a reaction force against the pulling action of the rotating auger means. Additionally, the support assembly is readily movable from inactive to active positions and adjustable in all directions to achieve the required support.

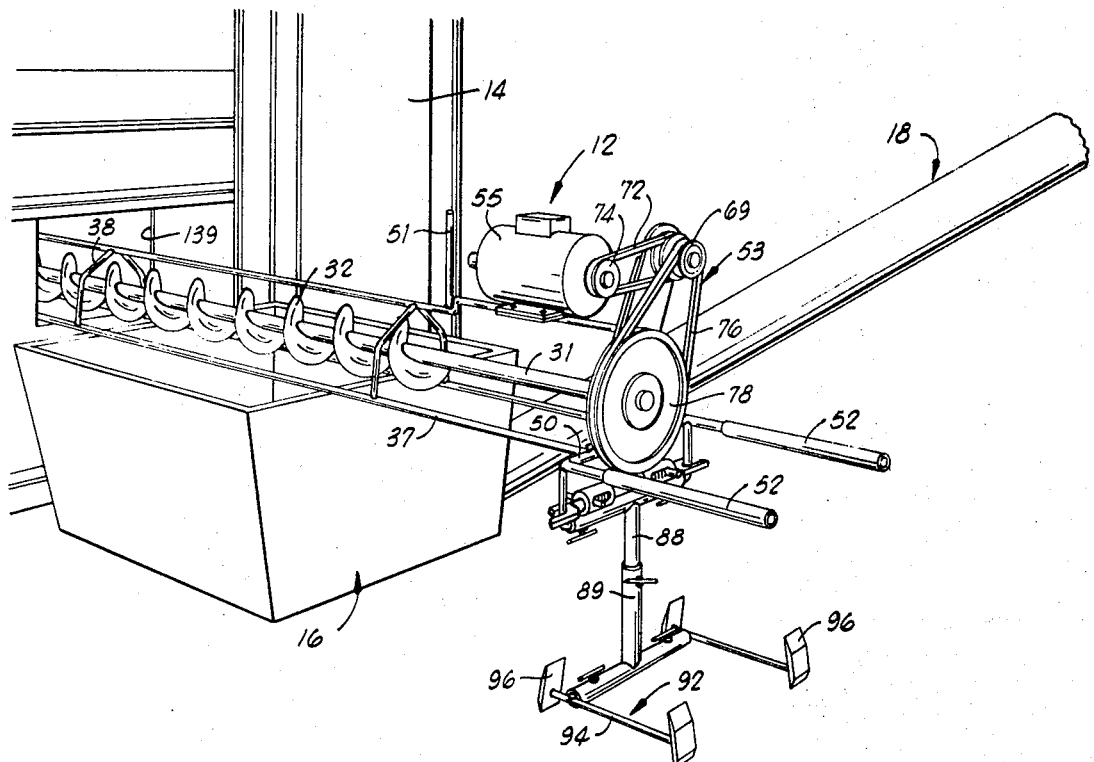
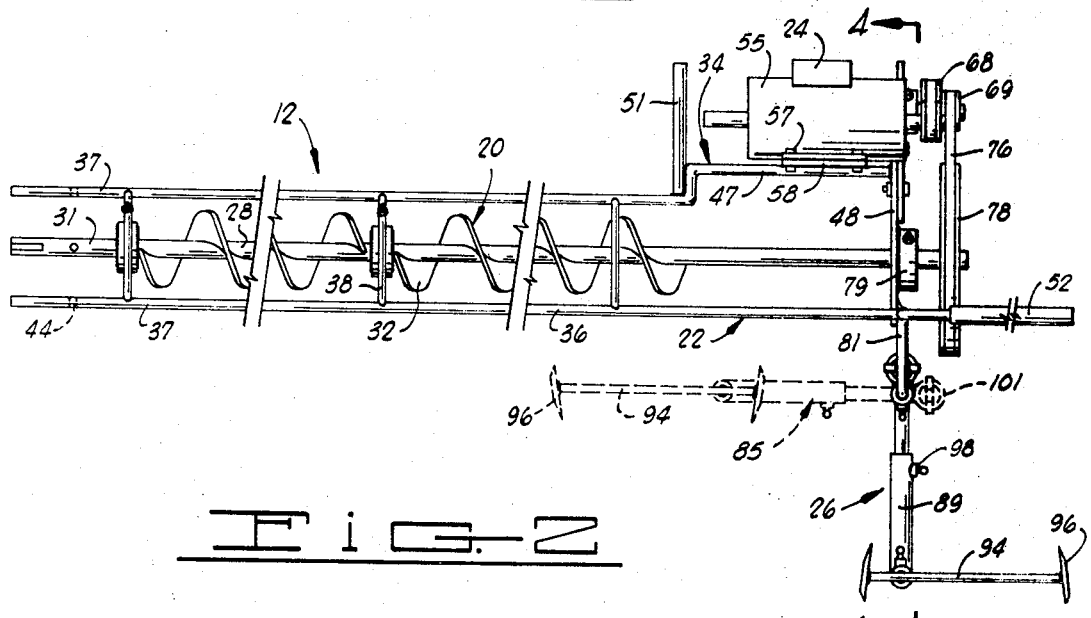

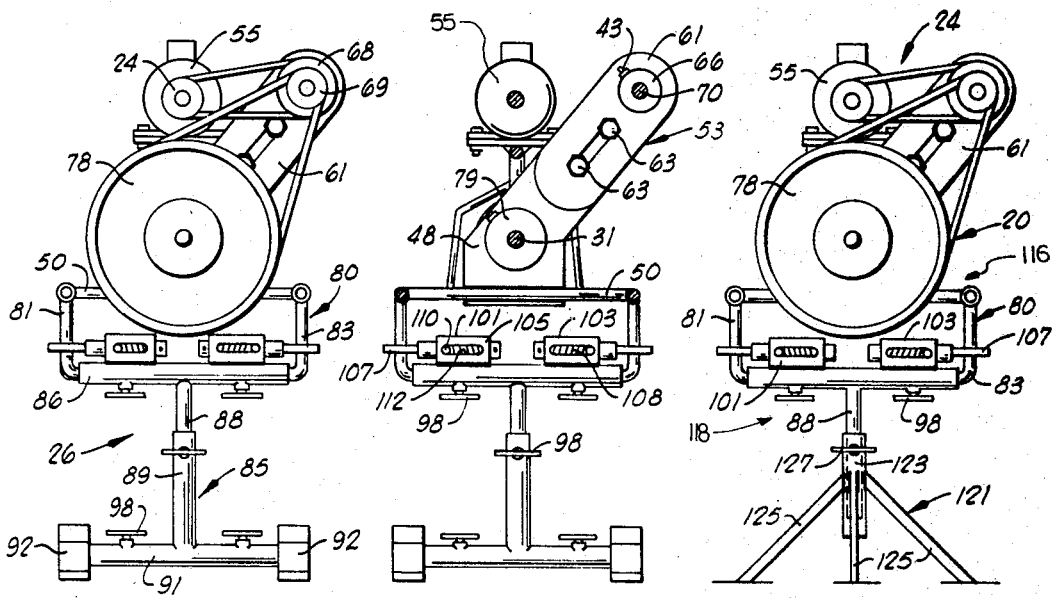
Fig.3  Fig.4  Fig.5
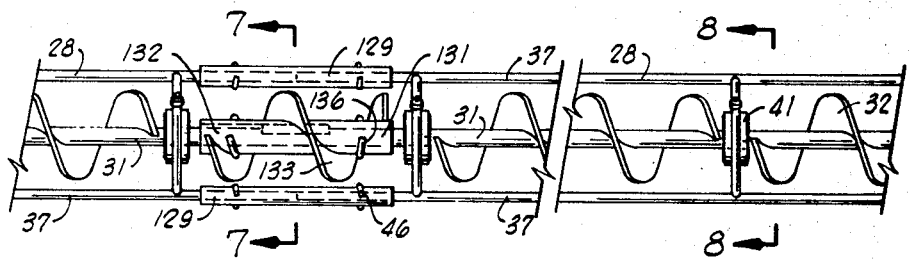
Fig.6
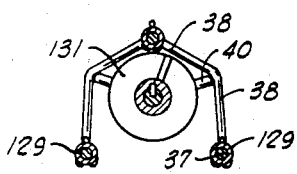 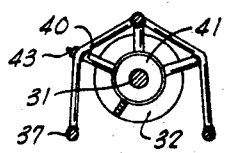
Fig.7  Fig.8

PORTABLE AUGER APPARATUS

Portable auger structures are known to the prior art but are generally restricted in usage and provided with housing means thereabout and, therefore, are not operable as efficiently and effectively as the applicant's invention. The prior art devices are portable auger structures for unloading a storage bin with the vertical walls of the bin having an opening and the auger is inserted into the opening to receive material and consequently move the material outwardly into an upwardly moving conveyor. The prior art device are difficult to insert the auger into the bin and requiring considerable manual labor. Also, the prior art devices are generally complicated in structure, not operable so as to be positioned at various heights, and are limited in overall length so that the same is restricted in usage as to size, structure, and location of any storage bin to be unloaded.

In one preferred embodiment of this invention a portable auger apparatus includes an elongated auger means connected to a frame assembly; a power means mounted on the frame assembly and operably connected to the auger means so as to provide the necessary operating power; and a support assembly secured to the frame assembly adapted to maintain the same against a supporting surface. The auger means includes auger assemblies available in segments and connectable to the open frame assembly to achieve the desired length. The auger assembly includes an elongated support shaft mounted in support bearings having integral auger flights for the movement of material on rotation of the support shaft in a substantially conventional manner. The frame assembly includes a power mount assembly at one end with an auger mount structure extended therefrom. The auger mount structure is provided with tubular members interconnected as by support struts and having the support shaft of the auger assembly rotatably connected thereto by the spaced bearings. The power means includes a motor member mounted upon the power mount assembly and operably connected through belts and pulley structures to the outer end of the support shaft of the auger assembly. The power mount assembly includes a main pipe secured to lower ones of the tubular members and rearwardly extended handle members. A motor mount plate is secured to the main pipe extended perpendicular to the handle members. The support assembly includes a base stand having adjustable telescoping pipe members connected at the lower end to a horizontally extended support tube member having foot assemblies connected thereto. The foot assemblies are adjustable laterally and rotatable about a horizontal axis in order to provide the necessary attachment to a ground surface on which it is supported. Additionally, the base stand is provided with spring latch assemblies operable to release the same from a generally vertical position for movement to a horizontal position which is useful in storage and transporting purposes.

One object of this invention is to provide an auger apparatus overcoming the aforementioned disadvantages of the prior art structures.

One further object of this invention is to provide a portable auger apparatus wherein an outwardly projected auger assembly is operable for removing grain or the like from within a storage bin and is unlimited as to its possible penetration within the storage bin.

One other object of this invention is to provide a portable auger apparatus including an auger means provided in sections for unlimited length secured to a frame assembly, a power means connected to the auger means to provide the desired rotation, and an adjustable support assembly connected to the frame assembly to provide the desired height and angular relationship of the auger means relative to a support surface for removing grain from a storage bin.

Still, another object of this invention is to provide a portable auger apparatus which is self-powered, capable of being moved and operated by one person, supported for up and down tilting movements, and provided with a support assembly to provide the necessary reaction force required on rotation of the apparatus.

One other object of this invention is to provide auger apparatus for removing grain from a storage area which is easily handled by one man, lightweight, economical to manufacture, and efficient in operation to quickly move grain or the like.

Various other objects, advantages, and features of the invention will become apparent to those skilled in the art from the following discussion, taken in conjunction with the accompanying drawings, in which:

FIG. 1 is a perspective view of a portable auger apparatus of this invention, illustrated in a position for unloading grain from a storage bin into a container box device for movement by an auger conveyor therefrom;

FIG. 2 is a foreshortened, side elevational view of the portable auger apparatus of this invention illustrating a support assembly in a storage positioned in dotted lines;

FIG. 3 is a front elevational view of the portable auger apparatus of this invention;

FIG. 4 is a sectional view taken along line 4—4 in FIG. 2;

FIG. 5 is a view similar to FIG. 3 illustrating another embodiment of a support assembly of the portable auger apparatus of this invention;

FIG. 6 is a foreshortened, fragmentary side elevational view of the auger assembly of the portable auger structure of this invention;

FIG. 7 is a sectional view taken along line 7—7 in FIG. 6; and

FIG. 8 is a sectional view taken along line 8—8 in FIG. 6.

The following is a discussion and description of preferred specific embodiments of the new portable auger apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a portable auger apparatus of this invention, indicated generally at 12, is shown as in the operating condition and extended within a storage bin 14 to remove grain or other such material therefrom. The auger apparatus 12 is operable on rotation to pull the material outwardly into a generally rectangular box structure 16 having an auger conveyor 18 therein. It is seen that this invention operates to move grain into the box structure 16 whereupon the same is subsequently conveyed upwardly by the auger conveyor 18 and into a transport truck or the like.

The portable auger apparatus 12 includes an elongated auger means 20 connected to a frame assembly 22; a power means 24 mounted upon the frame assembly 22 and operably connected to the auger means 20; and a support assembly 26 connected to the frame assembly 22 to provide the necessary vertical and reaction support for reasons to become obvious. The auger means 20 may be provided with various interconnectable sections but mainly includes a first auger assembly 28 rotatably connected to the frame assembly 22. The auger assembly 28 includes an elongated support shaft 31 having integrally secured about its outer surface an elongated spiral auger flight 32 to move material in a conventional manner.

The frame assembly 22 includes a first power mount assembly 34 having extended laterally therefrom an auger mount structure 36. The auger mount structure 36 includes three parallel spaced pipe members 37 interconnected as by support struts 38 to provide an open frame generally of semicircular shape about the auger assembly 22, Additionally, at spaced intervals, the support struts 38 are connected by posts 40 to bearing members 41 which are mounted about the support shaft 31. Additionally, certain ones of the posts 40 are connected to the respective bearing members 41 through zerks 43 to provide the necessary lubrication. The outer ends of each pipe member 37 is provided with a hole 44 to receive a lock pin 46 therein for attaching various sections of the auger assemblies 22 so that the same may be projected to any length. The power mount assembly 34 includes a pipe extension 47 secured to the central pipe member 37 and connected to a support plate 48 which has its lower edge secured as by welding to a cross pipe 50. Additionally, it is seen that the adjacent ends of the other two pipe members 37 are similarly secured as by welding to the cross pipe 50 to provide the necessary rigidity. An upright pipe handle 51 is secured to the junction of the central pipe members 37 and the pipe extension 47 operable to lift and guide the apparatus 12. Handle members 52 secured to the cross pipe 50 extend rearwardly for lifting the apparatus 12.

As shown in FIGS. 1 and 4, the power means 24 includes a power conveyance assembly 53 connected to the support plate 48 and operably connected to a motor member 55. The motor member 55 is secured as by bolts 57 to a motor mount plate 58 which is secured to the upper surface of the pipe extension 47. It is obvious that the motor member 55 may be adjustable relative to the mount plate 58 to provide the necessary belt tensioning as will become a obvious.

As seen in FIG. 4, the power conveyance assembly 53 includes an adjustable plate member 61 secured as by bolts 63 to the upright support plate 48. The upper end of the plate member 61 supports a bearing member 66 having a pair of pulley members 68 and 69 mounted on a shaft 70. The pulley member 68 is connected through a belt member 72 to a drive pulley 74 on the motor member 55. The other pulley member 69 is connected by a belt member 76 to a large driven pulley 78 secured to the outer end of the support shaft 31 of the auger means 20. The support plate 48 is provided with a bearing member 79 to receive the support shaft 31 therethrough. Additionally, it is seen that all of the aforementioned bearing members are provided with grease zerk members 43 to provide the necessary lubrication. It is also noted that the bolts 63 may be used to regulate the distance of the pulley members 68 and 69 from the driven pulley 78 to provide the necessary tension of the respective belt members 72 and 76.

The support assembly 26 includes a base stand 80 rotatably mounted upon downwardly depending support arms 81 and 83 which are secured to opposite ends of the cross pipe 50 and the base stand 80 is connected to a kick or foot stand assembly 85. The base stand 80 includes a first horizontal pipe member 86 telescoped about the support arms 81 and 83 and a downwardly depending base pipe 88 telescopically mounted in a support pipe 89 of the foot stand assembly 85. The support pipe 89 is welded to a horizontal tube member 91 having foot members 92 telescopically mounted in opposite ends thereof. The foot members 92 are provided with a generally T-shape support rod 94 having an anchor plate 96 mounted on opposite exposed ends for engagement with the support surface. It is seen that numerous rotatable lock screw members 98 are provided on the various telescoping parts of the support assembly 26 so that the same may be positioned as desired relative to the spacing of the foot members 92; the vertical height of the auger means 20; and the angular position of the support assembly 26 on the cross pipe 50.

Additionally, the support assembly 26 is provided with a pair of spring latch assemblies 101 and 103 secured as be welding to the upper surface of the pipe member 86 and releasably connected to the downwardly depending support arms 81 and 83, respectively, to hold the same in a generally vertical position. More specifically, each spring latch assembly 101 and 103 is provided with a main housing 105 having a fork member 107 biased outwardly by a compression spring 108 into engagement about a respective one of support arms 81 and 83. Each fork member 107 is secured to a laterally extended actuator pin 110 engageable with one end of a slot 112 in the housing 105 under force of the spring 108. The actuator pin 110 can be moved inwardly against the force of the compression spring 108 so as to move the fork member 107 out of engagement with the respective support arms 81 and 83 so that the entire support assembly 26 can be rotated to the horizontal position shown in dotted lines in FIG. 2 for storage and transporting purposes. In doing so, it is obvious that the lock screw members 98 on the tube member 91 will be released for movement to a desired angle. Additionally, on release of the respective spring latch assemblies 101 and 103, it is obvious that the support assembly 26 can be rotated to any desired angular position depending upon the terraine and reaction force needed to balance the action of the auger means 20.

As illustrated in FIG. 5, another embodiment of a portable auger apparatus 116 of this invention includes the identical auger means 20 operably connected to the same power means 24 but having a different support assembly 118. The support assembly 118 includes the base stand 80 having the base pipe 88 telescopically mounted within a tripod assembly 121. The tripod assembly 121 includes a main support tube 123 to receive the base pipe 88 and having downwardly diverging leg members 125 secured to a central portion of the support tube 123. Additionally, a lock pin member 127 is mounted on the support tube 123 engageable with the base pipe 88 to secure same in a desired vertical position. It is obvious that the portable auger apparatus 116 is operable similar to the other auger apparatus 12 varying only the means for supporting the same upon a ground surface.

As shown in FIGS. 2 and 6, it is seen that each auger assembly 28 may be interconnected to an adjacent auger assembly 28 through the use of tubular sleeves 129 adapted to telescopically receive respective ends of the three pipe men members 37 of the frame assemblies 22 therein as shown in FIG. 6. The connecter sleeves 129 are provided with the lock pins 46 operable to secure the respective pipe members 37. A specially designed auger adapter 131 is provided having a main cylindrical portion 132 with an auger flight 133 on the outer surface thereof and operable to telescopically receive abutting end portions of the support shafts 31 therein. Anchor pins 136 on the cylindrical portion 132 secures same to the support shafts 31. This operates to provide an extension of the various abutting auger assemblies 28 to provide the uninterrupted flow of material by use of the auger means 20.

In the use and operation of the portable auger apparatus 12 of this invention, it is seen that the auger means 20 is adjusted vertically through the use of the support assembly 26 so that the same extends within an opening 139 in the storage bin 14. It is obvious that the foot members 92 can be rotated about the support pipe 91 and secured by the lock screw members 98 in a desired angle to provide a reaction force to operation of the auger means 20. Thereupon, the power means 24 can be activated on providing a power source to the electrical motor member 55 through the power conveyance assembly 53 to rotate the driven pulley 78 and the auger assembly 28. It is obvious that this will result in the movement of material outwardly from the storage bin 14 due to the open frame assembly 22 and will be operable initially, if desired, to pull itself within the storage bin 14. The power means 24 is illustrated as an electric motor but the same could easily be an internal combustion engine so as to make the same independent in operation.

It is obvious that various ones of the auger assemblies 28 may be interconnected through the connecter sleeves 129 and the auger adapter 131 as illustrated in FIG. 6 to reach any desired position within the storage bin 14. It is noted that the respective lock pin members may be regulated to adjust various ones of the telescoping pipe members of this invention. Also, it is seen that the foot members 92 are provided with the upright anchor plates 96 so as to provide the desired reaction force not dependent on the rotational direction of the auger means 20.

It is seen that the portable auger apparatus of this invention provides a neat appearing structure being lightweight and readily operable by one person to unload and convey material such as grain or the like from within a storage container. Additionally, the power auger apparatus of this invention is economical to manufacture, simple to operate, and provided with a plurality of vertical and horizontal adjustment features so as to be usable in any size or storage container.

While the invention has been described in conjunction with preferred specific embodiments thereof, it will be understood that this description is intended to illustrate the invention, which is defined by the following claims.

I claim:
1. An apparatus adapted to remove material from a container through an opening in a sidewall of the container, comprising:
   a. a frame assembly having depending support arms;
   b. an auger means having at least one auger assembly rotatable connected to said frame assembly;
   c. a power means mounted upon said frame assembly operably connected to said auger assembly for the rotation thereof;
   d. a support assembly connected to said frame assembly to contact a support surface for providing vertical support to said auger means;
   e. said support assembly having latch assemblies engageable with said depending support arms of said frame assembly and said base support assembly connected thereto;
   f. said base support assembly having foot assemblies engageable with the support surface adjustable mounted so as to be positioned at any desired angle relative to a horizontal axis;
   g. said foot assemblies each having a horizontal tube member with a support rod mounted therein for rotational movement about a horizontal axis and anchor plates secured to opposite ends to said support rod; and
   h. lock screw members connected to said tube member engageable with said support rod to anchor same in a given position whereby said anchor plates are engageable with a support surface in a firm manner regardless of irregular terrain.

2. An apparatus as described in claim 1, wherein:
   a. said frame assembly having elongated spaced pipe members and support struts interconnecting said pipe members and having bearing members connected to said support struts and said support shaft for the rotation of said auger assembly whereupon said frame assembly is open to receive grain thereto at any point for movement outwardly of the container;
   b. auger adaptors and connecter sleeves; and
   c. further auger assemblies connected to said first auger assembly by said auger adaptors and connecter sleeves for conjoint rotation and support, respectively, whereby said pipe members, a said support struts, and said bearing members permit extension of said auger means to any desired length.

3. An apparatus as described in claim 1, wherein:
   a. said support assembly having said base support assembly provided with adjustable telescoping pipe members and screw members anchoring same in a desired relative location; and
   b. said latch assemblies releasably connected to said support arms in the vertical position and releasing the same for movement to a generally horizontal position for storage and transporting purposes.

4. An apparatus as described in claim 1, wherein:
   a. said support assembly has a depending support post and a tripod assembly connected thereto; and
   b. said tripod assembly has a main cylindrical support base telescopically mounted about said support post and has downwardly divergent support legs for engagement with a support surface to provide the necessary reaction force during rotation and operation of said auger means.